United States Patent
Scheibe et al.

(10) Patent No.: US 9,091,368 B2
(45) Date of Patent: Jul. 28, 2015

(54) METHOD AND MANUFACTURE OF VALVES DRIVEN BY AN ACTUATOR

(71) Applicant: Buerkert Werke GmbH, Ingelfingen (DE)

(72) Inventors: Ralf Scheibe, Kuenzelsau (DE); Christian Hartmann, Krautheim (DE)

(73) Assignee: BUERKERT WERKE GMBH, Ingelfingen (DE)

( * ) Notice: Subject to any disclaimer, the term of this patent is extended or adjusted under 35 U.S.C. 154(b) by 189 days.

(21) Appl. No.: 13/865,885

(22) Filed: Apr. 18, 2013

(65) Prior Publication Data

US 2013/0277591 A1 Oct. 24, 2013

(30) Foreign Application Priority Data

Apr. 20, 2012 (DE) .................. 10 2012 007 766

(51) Int. Cl.
*F16K 31/52* (2006.01)
*F16K 31/06* (2006.01)

(52) U.S. Cl.
CPC ............ *F16K 31/52* (2013.01); *F16K 31/0624* (2013.01); *F16K 31/0655* (2013.01); *Y10T 29/49412* (2015.01)

(58) Field of Classification Search
CPC . F16K 31/52; F16K 31/0624; F16K 31/0655; Y10T 29/49412
USPC ........ 137/625.44; 251/129.17, 129.18, 129.2; 251/297
See application file for complete search history.

(56) References Cited

U.S. PATENT DOCUMENTS

| | | | | |
|---|---|---|---|---|
| 2,562,631 A | * | 7/1951 | Morrison ................. | 251/129.17 |
| 2,570,450 A | * | 10/1951 | Hottenroth ................. | 251/129.2 |
| 2,861,591 A | | 11/1958 | Hertel | |
| 2,901,000 A | * | 8/1959 | Wright .......................... | 137/527 |
| 3,143,131 A | * | 8/1964 | Spencer ....................... | 137/269 |
| 3,176,516 A | | 4/1965 | Guenther | |
| 3,683,962 A | * | 8/1972 | Good ............................ | 137/868 |
| 3,991,788 A | * | 11/1976 | Kull .............................. | 137/863 |
| 4,250,924 A | | 2/1981 | Sakakibara et al. | |
| 4,527,590 A | * | 7/1985 | Kolze ........................ | 137/596.17 |
| 4,986,308 A | * | 1/1991 | Champseaux ........... | 137/625.44 |
| 5,027,857 A | * | 7/1991 | Champseix .............. | 137/625.44 |
| 5,205,323 A | * | 4/1993 | Baker ....................... | 137/625.44 |
| 5,653,422 A | * | 8/1997 | Pieloth et al. .............. | 251/129.2 |
| 6,003,552 A | * | 12/1999 | Shank et al. .............. | 137/625.44 |
| 6,484,754 B1 | | 11/2002 | Muth et al. | |
| 6,830,231 B2 | * | 12/2004 | Paessler et al. ................ | 251/64 |
| 2003/0070716 A1 | | 4/2003 | Giousouf et al. | |
| 2006/0266425 A1 | | 11/2006 | Erath et al. | |
| 2011/0133108 A1 | | 6/2011 | Bezold et al. | |

FOREIGN PATENT DOCUMENTS

| | | |
|---|---|---|
| DE | 19854620 A1 | 6/2000 |
| DE | 20116898 U1 | 2/2002 |

(Continued)

OTHER PUBLICATIONS

German Patent Office, Search Report for DE 10 2012 007 766.1, dated Nov. 12, 2012, 6 pages.

*Primary Examiner* — John Bastianelli
(74) *Attorney, Agent, or Firm* — Stolowitz Ford Cowger LLP

(57) ABSTRACT

A method of manufacturing valves which are driven in particular in magnetic manner. At least one pressing piece is fastened to a rocker for moving a sealing element, in fact in a position of adjustment for adjusting a fixed valve stroke. Further, a valve and a valve bank are suggested.

22 Claims, 6 Drawing Sheets

(56) References Cited

FOREIGN PATENT DOCUMENTS

| DE | 10346804 | A1 | 4/2004 |
| DE | 10313484 | A1 | 10/2004 |
| DE | 202009016447 | U1 | 4/2010 |
| DE | 102009010312 | B3 | 9/2010 |

* cited by examiner

METHOD AND MANUFACTURE OF VALVES DRIVEN BY AN ACTUATOR

CROSS-REFERENCE TO RELATED APPLICATION

This application claims priority to German Patent Application Ser. No. 102012007766.1, filed on Apr. 20, 2012, the contents of which are herein incorporated by reference in their entirety.

FIELD OF THE INVENTION

The invention relates to a method of manufacturing valves which can be driven by an actuator, the respective valve comprising a cavity, fluid channels being provided which open into the cavity, at least one fluid channel orifice being defined by a valve seat which can be closed or unblocked by a sealing element, and a pivotable rocker being arranged in the cavity and an actuator being coupled to at least one rocker arm.

The invention further relates to a corresponding magnetically driven valve as well as to a valve bank consisting of identically constructed valves.

In particular, the invention relates to a method of manufacturing miniaturized valves, corresponding miniaturized valves as well as to a miniaturized valve bank.

However, the invention particularly relates to membrane valves in which a membrane extends through the cavity and delimits a fluid space from the cavity.

BACKGROUND

Miniaturized valves of this type are defined by an extremely short valve stroke of at most 0.4 mm and/or by a very small fluid space of at most 300 mm$^3$, preferably at most 100 mm$^3$, the fluid space even coming down to 10 mm$^3$ only.

Valves, in particular miniaturized membrane valves working with a rocker to open and close the fluid channels, call for an extremely high manufacturing expense. This is based on the small manufacturing tolerances of the individual components ensuring the short valve stroke. The several components arranged in series each have a range of tolerance which may add up to an overall tolerance that may be almost equal to the valve clearance and the valve stroke. Therefore, valve strokes ranging from 0.2 to 0.3 mm can only be achieved with smallest allowable manufacturing tolerances.

U.S. Pat. No. 4,250,924 shows a valve which, however, does not constitute a miniaturized valve. Here, a sealing element is fastened to a cover underneath each valve seat formed on the cover, the latter delimiting the cavity in upward direction. This fastening of the sealing element is carried out by means of a U-shaped, elastically yielding frame part carrying the sealing element. Depending on the switching condition of one of the sealing elements, the rocker can press against the valve seat and close it. In this process, the rocker is realized as a pure pressing means. The reset for opening the valve seat is effected by the elastically yielding frame which carries the sealing element. One of the two rocker arms is provided with an adjustment screw which allows adjusting the distance of the screw to the sealing element and thus the inclination of the rocker in the initial position.

It is the object of the invention to provide a method of manufacturing a valve, a valve as well as a bank of valves, in which the valve stroke lies within closest limits without involving an extra manufacturing expense.

SUMMARY

A method according to the present invention is for manufacturing valves which are driven by an actuator. The respective valves comprise a cavity, fluid channels opening into the cavity, a pivoting rocker arranged in the cavity and an actuator coupled to at least one rocker arm, at least one fluid channel orifice being defined by a valve seat which can be closed or unblocked by a sealing element. The method comprises the following steps:
  a) providing at least one pressing piece,
  b) adjusting the position of the pressing piece relative to the rocker in the actuation direction of the sealing element,
  c) fastening the pressing piece to the rocker in the position of adjustment and
  d) coupling the rocker to the sealing element in and contrary to the actuation direction of the sealing element.

With the method according to the invention, a pressing piece which has been adjusted beforehand is fastened to the rocker and lies in the line of force between the coil and the sealing element. In particular, the pressing piece is that part which directly engages the sealing element in order to close the valve seat. The valve stroke can be exactly adjusted by the position of the pressing piece relative to the rocker and thus relative to the swivel axis of the rocker. In contrast to prior art according to U.S. Pat. No. 4,250,924, the sealing element is coupled to the rocker and hence to the rocker motion and can be actively shifted depending on the latter. This means that the sealing element is pressed against the sealing seat in the closed position when the rocker is moved in the one direction. If the rocker is moved in the opposite direction, however, the sealing element is actively lifted off from the valve seat by the sealing element being actively pulled away from the sealing seat. Coupling the sealing element to the rocker may either be effected in that the rocker itself is immediately fixed on the sealing element, or in indirect manner by fastening the sealing element to the pressing piece which in turn is firmly coupled to the rocker. Due to this way of coupling, adjusting the pressing piece also allows for adjusting the maximum stroke in both opposite directions (actuation directions of the sealing element), which is extremely important for a miniaturized valve. In prior art according to U.S. Pat. No. 4,250,924, the maximum stroke is predefined by the non-adjustable frame carrying the sealing element. Starting from this maximum stroke, the sealing element can be moved by the adjustment screw only in such a manner that it approaches the sealing seat. If a maximum stroke of only 0.2 to 0.3 mm is provided, however, it must be guaranteed that the sealing element can also be adjusted so as to move away from the sealing seat. This is made possible with the invention by coupling the sealing element to the rocker, as it is possible in this way to pull away the sealing element from the sealing seat in the initial position in order to increase the maximum stroke. This also allows installing e.g. thick sealing elements without any problems, which are in the upper range of the tolerance in thickness. This is not possible in prior art according U.S. Pat. No. 4,250,924.

The method according to the invention makes provision that the pressing piece is individually adjusted in step b) for each manufactured valve so that the differing lengths of the pressing piece automatically occurring during manufacture due to the tolerances, the different dimensions of the individual rockers and plungers as well as the position of the swivel axis and the housing dimensions which define the cavity, do not have a negative impact on the accuracy of the valve stroke. The additional adjustment will be more than compensated for because of the lower reject and the larger possible manufacturing tolerances of the individual parts.

The object according to the invention with regard to the provision of a valve in which a precise and small valve stroke can be achieved without any additional overhead is achieved with a valve comprising a cavity, fluid channels being provided which open into the cavity, at least one fluid channel orifice being defined by a valve seat which can be closed or unblocked by a sealing element, and a pivotable rocker being arranged in the cavity and an actuator being coupled to at least one rocker arm. The valve according to the invention is characterized by at least one separate pressing piece which is fastened to the rocker and contacts the sealing element with one end and moves it to an end position. The separate pressing piece is fastened in a longitudinal guide in the rocker via a fastening means. Prior to fastening the pressing piece, the longitudinal guide allows a displacement of the pressing piece in the actuation direction of the sealing element and contrary to the actuation direction. The rocker is coupled to the sealing element in and contrary to the actuation direction of the sealing element, i.e. is coupled directly or indirectly so that in one actuation direction the sealing element is pressed against the valve seat and in the other direction the sealing element is actively lifted off from the sealing seat by a motion of the rocker, preferably is pulled away from it. The fastening means may be a mechanic fastening means such as a clip or the like or an adhesive, for instance a kind of potting compound, or also a welding connection such as an ultrasonic welding connection. In case of a multi-part rocker which surrounds the pressing piece in the manner of a clamp and hence clamps it, the parts will be welded, for instance. It goes without saying that some of these fastening means can be combined with one another.

The following features apply to the method according to the invention as well as to the valve of the invention. It is only for simplcation that they are jointly presented both for the method and for the valve.

Each of the two rocker arms may have an associated valve seat. This means that two valve seats are provided. Each valve seat has its own pressing piece which is individually fastened to the rocker. Thus, the position of the two pressing pieces is individually established for each manufactured valve, more specifically relative to the rocker in the actuation direction of the sealing element and before fastening the pressing pieces to the rocker. Due to the fact that both rocker arms are provided with pressing pieces which can be individually adjusted independently of each other, the position of the rocker in the initial position relative to the sealing seats can be adjusted independently of the pressing pieces themselves. This offers a large freedom with respect to the adjustment of the maximum valve stroke.

As already explained, the invention relates to a method of manufacturing a miniaturized valve, and a miniaturized valve having the aforementioned properties regarding the valve stroke and/or the fluid space volume.

The at least one pressing piece may project through the rocker and contact the sealing element at one end and contact the plunger at the opposite end. Thus, the transmission of force takes place from the plunger immediately to the sealing element without interposition of the rocker.

The sealing element may be a plastic platelet, for instance, which is fastened to the rocker, or a membrane extending through the cavity.

The pressing piece can be received in an associated opening of the rocker and can be shifted in longitudinal direction in the opening during adjustment.

The fastening of the pressing piece to the rocker is carried out, for instance, by one or more mechanical clips, by gluing, press-fitting, potting or welding. In case of welding, it can be conceivable to weld a plastic plunger to a plastic rocker by means of ultrasonic welding, or to weld two half shells to each other which form the rocker and receive and clamp a plunger between them, for instance even a metallic plunger.

If several pressing pieces are installed in a valve, these can be identical parts. The term "identical parts" means that these are parts which are produced in terms of manufacturing with the same geometry and identical nominal dimensions, but which have slightly differing actual dimensions due to the manufacturing tolerances, only.

In case the rocker also serves for actively lifting off the sealing element from the valve seat, the at least one pressing piece can be fastened to the sealing element at the side of the sealing element opposite the valve seat. In this way, the sealing element is lifted off from the valve seat, optionally supported by the fluid pressure.

The fastening is effected here by a form-fit or at least with the aid of a form-fitting connection.

The at least one pressing piece should be in line with the associated valve seat when the valve seat is closed. This means in essence that the axis of the fluid channel in the region of the orifice should be in line with the axis of the pressing piece within the usual manufacturing tolerances.

Both rocker arms may be engaged by return springs so that the motion of the rocker is made possible by activating and deactivating the coil and a definite position of the rocker is ensured at any time.

The method according to the invention and the valve according to the invention make provision that the valve can be switched e.g. by means of a magnetic drive, the actuator comprising a coil and a plunger which can be driven by the coil.

As already explained, the invention also relates to a method of manufacturing a membrane valve as well as to a membrane valve itself.

The invention further relates to a valve bank with several identically constructed valves according to the invention, i.e. valves as described above. These identically constructed valves consist of identical parts, but the pressing pieces may have individual and in part differing positions relative to the rocker in the actuation direction of the sealing element, and the valves having the same valve stroke. With several hundreds or several thousands of valves produced with identical construction, it may of course happen that there are two valves in which the pressing pieces have an identical fit relative to the rocker within the measuring tolerances. Usually, however, there is a spread due to the manufacturing tolerances which have already been mentioned several times.

The invention is distinguished by valves which have an exactly adjusted, always equal stroke and thus always the same flow rate. This allows to improve the performance data of the valve, and the valve can be manufactured in a very reliable process.

DETAILED DESCRIPTION

Figure 1:
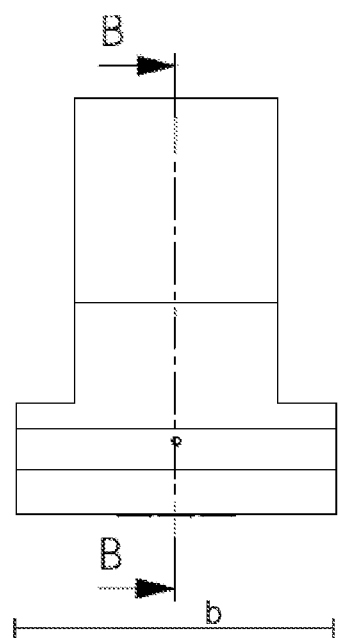
FIG. 1 is a side view of a valve according to the invention manufactured according to the method of the invention.
Figure 2:
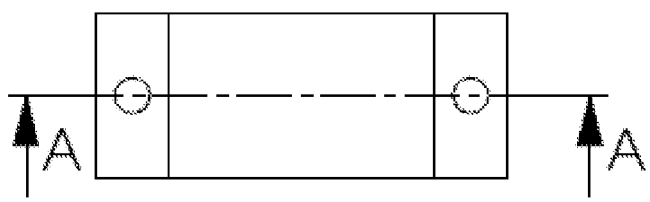
FIG. 2 is a top view of the valve according to FIG. 1.

FIGS. 1 and 2 illustrate a valve which has a maximum width b of 7 mm only. The valve is realized as a membrane valve and is driven by an actuator which will be explained below.

The membrane valve comprises several housing parts (see FIG. 3), namely a base part 10 in the form of a kind of plate, an intermediate part 12, a cover part 14 as well as a coil receptacle 16 which are stacked upon and fastened to one another, for instance by screws.

The base part 10, the intermediate part 12 and the cover part 14 are each provided with a center opening or recess which combine to form a cavity 18.

Figure 3:
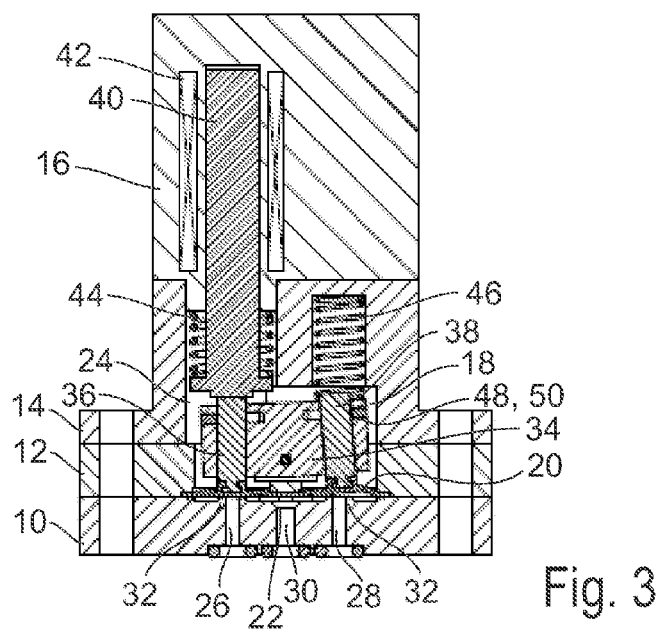
FIG. 3 is a longitudinal sectional view through the valve of FIG. 1 according to a first embodiment along section line A-A in FIG. 2.

A sealing element made of an elastic material, here a membrane 20, is clamped between the base part 10 and the intermediate part 12 and divides the cavity 18 in two hollow spaces which are separated in terms of fluidics, namely a lower part related to FIG. 3, also referred to as a fluid space 22, and a larger control space 24 situated at the opposite side of the membrane 20.

Three fluid channels 26 to 30 formed in the base part 10 open into the fluid space 22.

The fluid channel 30 ends approximately centrally in the fluid space 22, and the fluid channels 26 and 28 are on opposite sides of the fluid channel 30 and each open into a valve seat 32 which is an annular projection protruding to some extent into the fluid space 22.

A rocker 34 is accommodated in the control space 24 so as to be able to pivot in the housing. The swivel axis is referred to as 35.

The rocker 34 has two openings which preferably have a slight inclination with respect to each other and (apart from this inclination) are essentially in line with the respective fluid channels 26 and 28. A pressing piece 36, 38 is inserted in each of these openings.

The two rigid pressing pieces 36, 38 are associated to a fluid channel 26 and 28, respectively, and are in line with it.

The pressing pieces 36, 38 project right through the rocker 34 and slightly protrude with respect to the rocker on both sides. The pressing pieces 36, 38 have their membrane-side end connected to the membrane 20 by means of a form-fitting connection and/or through adhesion.

In the illustrated embodiment, each pressing piece 36, 38 has its membrane-side end provided with a kind of mushroom structure which is received in a form-fitting connection in a complementary structure in the membrane.

At the opposite end of the pressing piece 36, a plunger 40 presses against the pressing piece 36. The plunger 40 is part of an actuator, here of a magnetic drive, and protrudes into a coil 42 of the actuator which is housed in the coil receptacle 16. The plunger 40 is biased towards the pressing piece 36 via a return spring 44.

A return spring 46 presses against the rocker arm which comprises the pressing piece 38. Thus, both rocker arms are loaded by springs 44, 46, with the spring 46 being somewhat weaker than the spring 44 so that an initial position of the rocker will occur as shown in FIG. 3. In this position, the membrane 20 covers the valve seat 32 of the fluid channel 26, whereas the plunger 38 lifts off the membrane 20 in the region of the valve seat 32 from the fluid channel 28 and thus exposes the fluid channel 28. The fluid channel 30 is permanently open.

In the first end position of the rocker shown in FIG. 3, the coil 42 is not supplied with electric energy. Fluid can flow into the fluid space 22 via the fluid channel 28 and out of the valve again through the fluid channel 30.

In case the coil 42 is supplied with electric energy, the plunger 40 is pulled upwards so that the spring 44 is compressed and the return spring 46 pivots the rocker 34. The membrane 20 lifts off from the valve seat 32 of the fluid channel 26, whereas the valve seat 32 on the fluid channel 28 is closed.

The valve stroke between the two end positions ranges from 0.2 to 0.3 mm, as measured in the direction of motion of the membrane.

The fluid space 22 has a volume of at most 300 mm$^3$, in particular of at most 100 mm$^3$.

As can be seen in FIG. 3, the associated pressing piece 36 is exactly concentric with the orifice of the fluid channel 26 and with the valve seat 32 when the fluid channel 26 is closed. In this end position, the top end of the pressing piece 38 is slightly inclined in inward direction. If the membrane 20 closes the fluid channel 28, however, the pressing piece 38 is exactly aligned with the associated valve seat 32 of the fluid channel 28 due to the swivel motion of the rocker 34.

The two pressing pieces 36, 38 are identical parts.

As can easily be seen in FIG. 3, the valve stroke related to manufacturing tolerances depends on numerous parts, among other things on the distance of the axis 35 to the valve seats 32. In order to remove the deviations (due to the manufacturing tolerances that must be allowed in manufacturing) from the system, each membrane valve will be adjusted individually. In doing so, each pressing piece 36, 38 is adjusted in its axial position, i.e. in the actuation direction of the membrane (according to FIG. 3 in vertical direction, i.e. perpendicular to the membrane plane) to the ideal, desired stroke. This means that the position of each pressing piece 36, 38 within the associated rocker 34 is an individual position. In the position of adjustment, the pressing pieces 36, 38 will then be fastened to the rocker 34. This can be done in different ways and by means of various fastening means.

Figure 4:
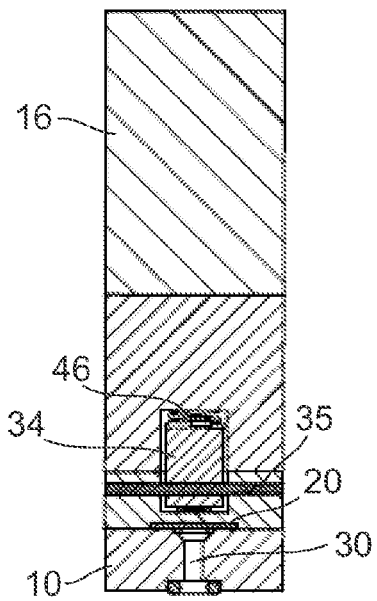
FIG. 4 is a cross-sectional view through the valve of FIG. 3 according to section line B-B in FIG. 1.
Figure 5:
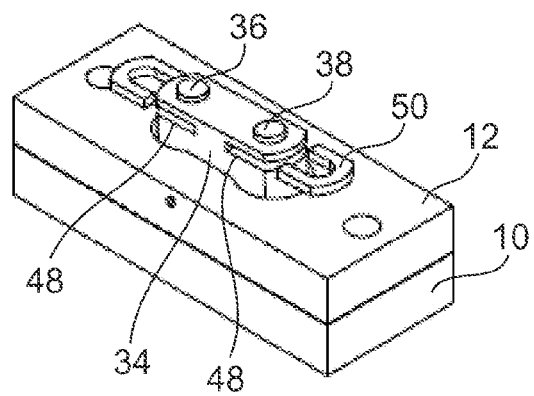
FIG. 5 is a perspective top view of a dismantled valve according to FIG. 3 where the rocker can be seen.

In the embodiment according to FIGS. 3 to 5, the rocker 34 has one slit 48 each in the region of the openings for receiving the pressing pieces 36, 38 (see FIG. 5). A fastening means, here a clip 50 e.g. with the shape of the letter "U", may be inserted in said slit; the clip receives the respective pressing piece 36, 38 and clamps it such that the pressing piece 36, 38 can no longer be axially shifted in the opening. The clamped position is to be seen in FIG. 3. The clip 50 has a height which is at least equal to the height of the slit 48 so that it is fitted inside the slit 48 without any axial clearance in axial direction.

The embodiments explained in the following essentially correspond to the previously explained embodiment; parts with identical function are provided with the already introduced reference numerals and only the differences will be elaborated in the following.

Figure 8:
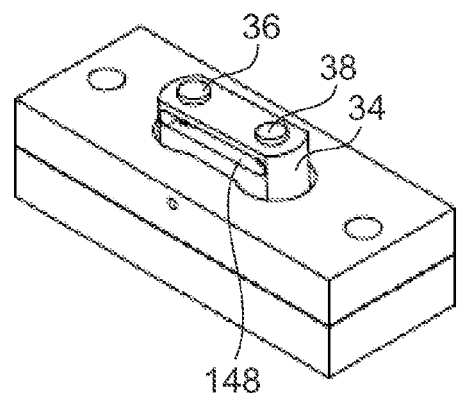
FIG. 8 is a perspective top view of the dismantled valve according to FIG. 6 showing the rocker.
Figure 6:
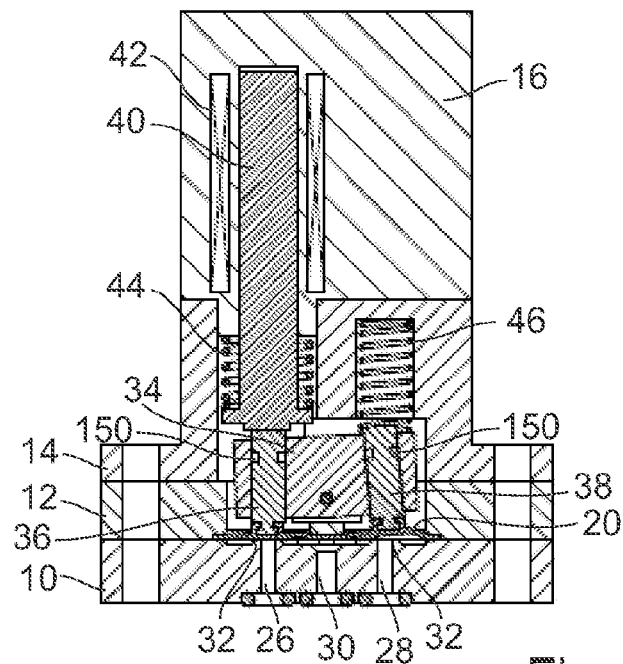
FIG. 6 is a longitudinal sectional view through a second embodiment of the valve according to the invention which is manufactured by the method of the invention, corresponding to line A-A in FIG. 2.
Figure 7:
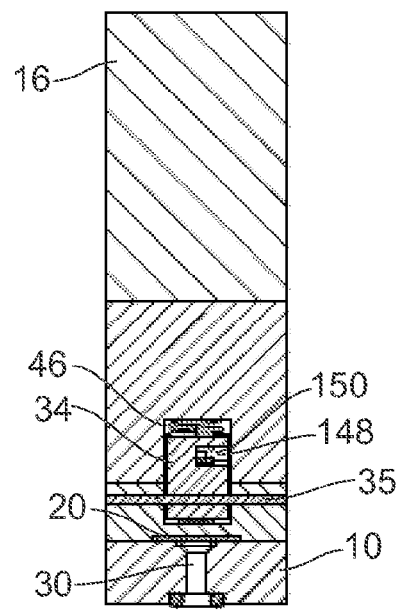
FIG. 7 is a cross-sectional view through the valve according to FIG. 6 along section line B-B in FIG. 1.

In the embodiment according to FIGS. 6 to 8, it is not a clip-type fastening which is provided for the pressing pieces 36, 38 in the rocker 34, but an adhesive connection. In order to receive the adhesive which constitutes a fastening means, the rocker has a lateral slit 148 starting from a side of the rocker 34 and extending as far as to the openings for receiving the pressing pieces 36, 38. Optionally or in addition to this, the pressing pieces 36, 38 have circumferential grooves 150 at the level of the slit 48 which can be filled by the adhesive. Here again, the pressing pieces 36, 38 are fastened to the rocker 34 after the individual adjustment of the pressing pieces 36, 38 relative to the rocker 34 and hence relative to the valve seats 32. The adhesive constitutes a potting compound.

So that the axially differing positions of the pressing pieces 36, 38 relative to the rocker 34 do not have any influence on the adhesive connection, the height of the slit 148 is larger than that of the grooves 150 so that it is always possible that the adhesive may enter the grooves 150 from the slit 148. This can be seen in FIG. 7.

Figure 9:
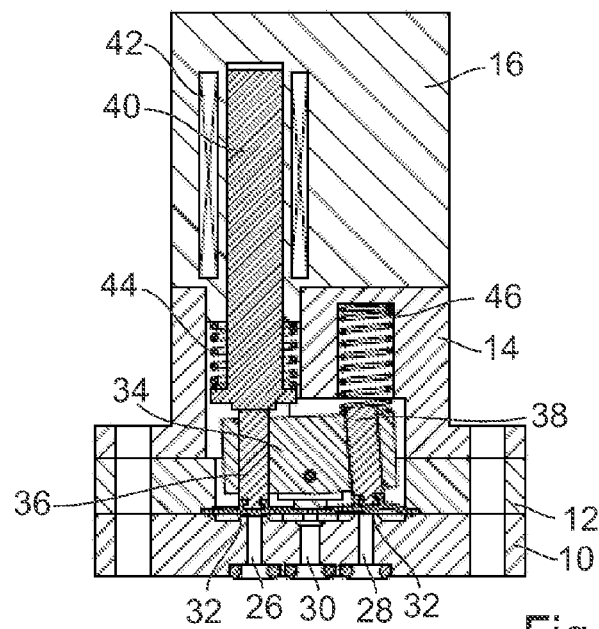
FIG. 9 is a longitudinal sectional view through a third embodiment of the valve according to the invention which is manufactured by the method of the invention, corresponding to line A-A in FIG. 2.
Figure 10:
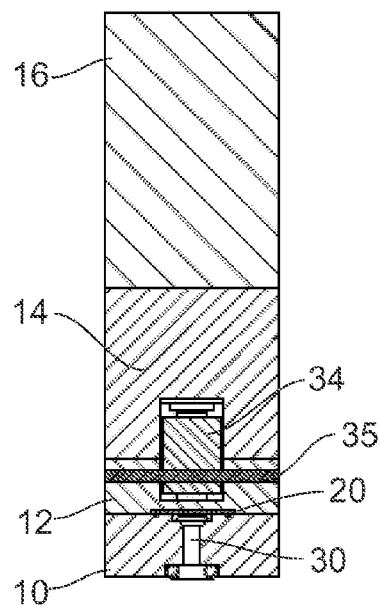
FIG. 10 is a cross-sectional view through the valve according to FIG. 9 along section line B-B in FIG. 1.
Figure 11:
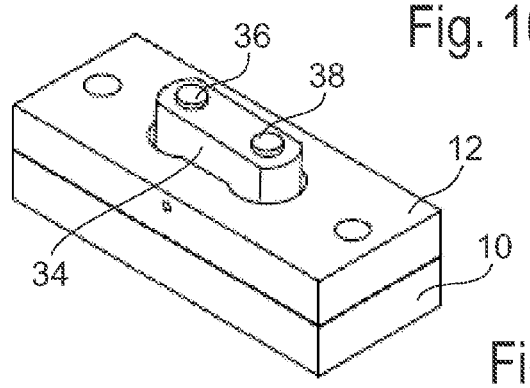
FIG. 11 is a perspective top view of the dismantled valve according to FIG. 9 showing the rocker.

In the embodiment according to FIGS. 9 to 11, the pressing pieces 36, 38 are positioned in the rocker 34 by a press-fit connection which forms a fastening means. Optionally or in addition thereto, a further fastening variant may be provided, for example by means of a bracket and/or by means of gluing.

In the embodiment according to FIGS. 9 to 11, the rocker 34 is realized in one piece; however, it could also consist of two halves like some kind of clamp, which are screwed to each other in order to clamp the pressing pieces 36, 38 between them.

Figure 12:
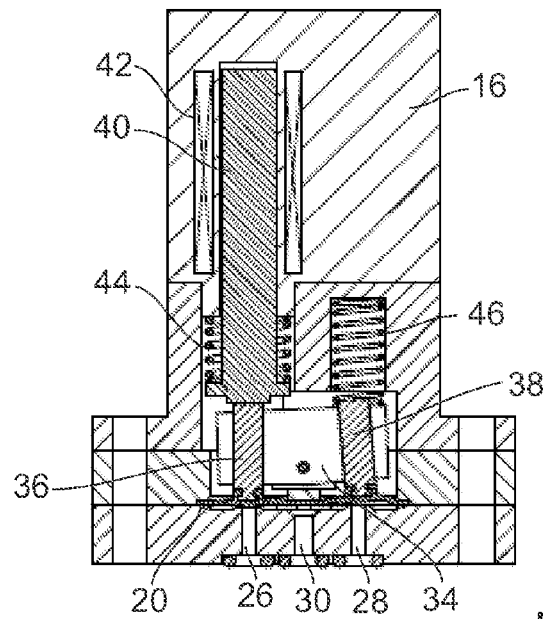
FIG. 12 is a longitudinal sectional view through a fourth embodiment of the valve according to the invention which is manufactured by the method of the invention, corresponding to line A-A in FIG. 2.
Figure 13:
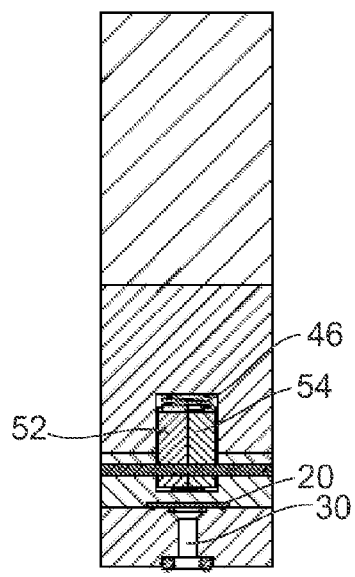
FIG. 13 is a cross-sectional view through the valve according to FIG. 12 along section line B-B in FIG. 1.
Figure 14:
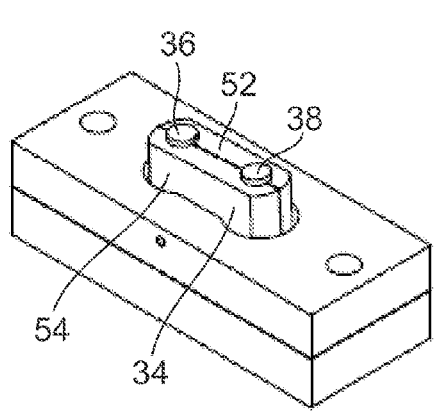
FIG. 14 is a perspective top view of the dismantled valve according to FIG. 12 showing the rocker.

This solution with two rocker halves is illustrated in FIGS. 12 to 14. The rocker halves are provided with the reference numerals 52, 54. They each comprise an inherent flute-shaped recess so that the rocker halves 52, 54 when assembled complement each other such that the two openings for receiving the pressing pieces 36, 38 will be formed.

In this embodiment, the rocker halves 52, 54 are welded by ultrasonic technology after having adjusted the pressing pieces 36, 38, whereby the pressing pieces 36, 38 are arrested in the rocker 34 in different position. The pressing pieces 36, 38 may be made from metal, but preferably they are made of plastics like the rocker halves 52, 54 so that all four parts are ultrasonically welded to one another.

Figure 15:
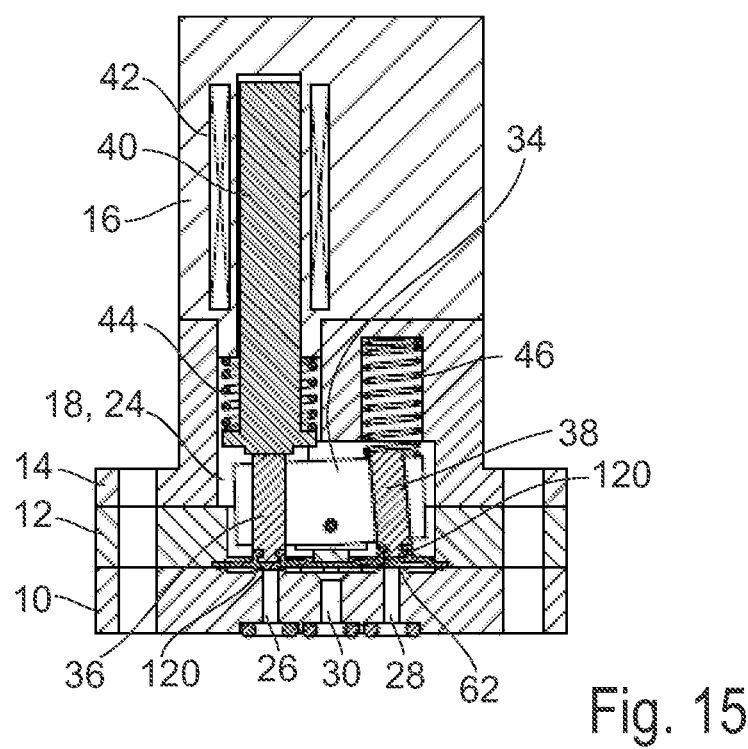
FIG. 15 is a sectional view through a further embodiment of the valve which is manufactured by the method of the invention and is part of a valve bank.

The embodiment according to FIG. 15 illustrates a valve which works without a membrane. Instead of the membrane, sealing elements 120 are fastened to the pressing pieces 36, 38 (preferably in the same manner as the aforementioned membrane), with which the pressing pieces can be pressed against the associated valve seats 32 in order to close them.

In other respects, the embodiment according to FIG. 15 corresponds to the previous embodiments, i.e. both the manufacture of the valve (which may be a miniaturized valve) and the detailed realization of the individual components may be identical to the various variants which have been explained above.

Basically, the pressing pieces 36, 38 may be fastened to the rocker 34 by potting, too; this applies to all embodiments, regardless of whether they comprise elastic individual sealing elements or a membrane.

It likewise applies to all embodiments that actuator types other than the magnetic drive can be used, for example pneumatic or hydraulic actuators or actuators with a piezo-type drive.

Regarding the embodiment of the valve without a membrane, comprising sealing elements on the pressing pieces, it is specifically provided that they are realized as miniaturized valves with a cavity 18 having a maximum volume of 1000 mm$^3$, preferably at most 400 mm$^3$.

All aforementioned valves that have been described can be realized as individual valve banks.

With a valve bank comprising identically constructed valves according to the present invention, which exclusively consist of identical parts, it can be stated upon measuring the individual valves that the pressing pieces 36, 38 have different positions in the actuation direction of the sealing element (in vertical direction with regard to the drawings) relative to the rocker 34, i.e. the pressing pieces 36, 38 have been individually adjusted.

In all embodiments, the sealing element(s) is/are directly or indirectly coupled to the rocker, especially mechanically coupled. Said coupling is established in and contrary to the actuation direction of the associated sealing element, i.e. in and contrary to the direction of motion of the sealing element to and away from the associated valve seat. The illustrated embodiments comprise a form-fitting connection between the pressing piece 36, 38 and the associated sealing element. In the illustrated embodiments, this is achieved by a kind of mushroom shape on the front end of the pressing piece, which may be locked in place in a corresponding complementary receptacle in the sealing element. It goes without saying that the geometry may also be realized in inverse design so that the mushroom shape is realized on the sealing element. Other types of the mechanical fastening are possible, too. Further, it would be conceivable to glue the sealing element to the pressing piece or to apply it by vulcanization. Further, the sealing element may be directly fastened to the rocker 34 so that the pressing piece 36, 38 bulges the sealing element only to some extent in the region of the portion which is pressed against the valve seat.

In all embodiments, a longitudinal guide is provided for adjusting the pressing piece in the rocker and is formed by the corresponding opening in the rocker 34. in the process of adjusting the pressing piece 36, 38, the latter can be shifted along said longitudinal guide.

Preferably, but not intended to be understood as limiting, the longitudinal guide is not realized as a thread and the pressing piece is not realized as a bolt. Due to the fact that the longitudinal guide allows a pure axial motion of the pressing piece 36, 38, the adjustment can be carried out in substantially shorter time by exerting a pure axial motion on the pressing piece in order to move it relative to the rocker.

The minimum stroke can be exactly adjusted by adjusting the pressing piece relative to the rocker and by fastening the sealing element to the rocker in direct or indirect manner.

The invention claimed is:

1. A method of manufacturing valves which are driven by an actuator, the respective valve comprising a cavity, a pivoting rocker arranged in the cavity and the actuator arranged to engage at least one rocker arm, fluid channels opening into the cavity, the respective channel openings each defined by a valve seat which can be closed or unblocked by a sealing element, the method comprising:

providing at least one pressing piece;

adjusting the position of the pressing piece relative to the rocker in the actuation direction of the sealing element;

fastening the pressing piece to the rocker in the position of adjustment; and connecting the rocker to the sealing element in and contrary to the actuation direction of the sealing element, wherein the actuator comprises a plunger, and wherein the at least one pressing piece projects through the rocker and has one end contacting the sealing element and an opposite end contacting the plunger.

2. The method according to claim 1, wherein the position of the associated pressing piece relative to the rocker is adjusted in the actuation direction of the sealing element individually for each manufactured valve.

3. The method according to claim 1, wherein the actuator is arranged to engage two rocker arms, and wherein the method further comprises:

providing a separate valve seat on each of the two rocker arms;

providing a pressing piece for each valve seat;

adjusting the position of the pressing piece individually for each manufactured valve relative to the rocker in the actuation direction of the sealing element; and fastening the pressing piece to the rocker in the position of adjustment.

4. The method according to claim 3, wherein identical parts are used for each pressing piece.

5. The method according to claim 1, wherein the at least one pressing piece is received in an associated opening in the rocker.

6. The method according to claim 1, wherein the at least one pressing piece is fastened to the rocker by at least one of clamping, gluing, press-fitting and welding.

7. The method according to claim 1, wherein the at least one pressing piece is connected to the sealing element at a side of the sealing element opposite the valve seat.

8. The method according to claim 1, wherein the valve is a miniaturized valve with a maximum stroke of 0.4 mm.

9. The method according to claim 1, wherein the valve is a membrane valve and the sealing element is a membrane, the membrane extending through the cavity and delimiting a fluid space from the cavity.

10. The method according to claim 1, wherein the actuator is a magnetic actuator comprising a coil configured to drive the plunger.

11. The method of claim 1, wherein the sealing element is configured to selectively close or unblock the valve seat in response to pivoting the rocker.

12. A valve comprising:

a cavity;

fluid channels opening into the cavity;

a pivotable rocker arranged in the cavity; and an actuator arranged to engage at least one rocker arm, at least one fluid channel opening defined by a valve seat which can be closed or unblocked by a sealing element being moved in an actuation direction, wherein at least one separate pressing piece is fastened in a longitudinal guide in the rocker via a fastening means, the pressing piece contacting the sealing element with one end and moving the sealing element to an end position, the longitudinal guide allowing a displacement of the pressing piece in and contrary to the actuation direction of the sealing element prior to fastening the pressing piece, wherein the rocker is connected to the sealing element in and contrary to the actuation direction of the sealing element, wherein the actuator comprises a plunger, and wherein the at least one pressing piece projects through the rocker and has one end contacting the sealing element and an opposite end contacting the plunger.

13. The valve according to claim 12, wherein the actuator is arranged to engage two rocker arms, and wherein each of the two rocker arms has a valve seat associated thereto and each valve seat has a separate pressing piece associated thereto which is fastened to the rocker.

14. The valve according to claim 12, wherein identical parts are used for each pressing piece.

15. The valve according to claim 12, wherein the at least one pressing piece is in line with the associated valve seat when the associated valve seat is closed.

16. The valve according to claim 12, wherein the at least one pressing piece is received in an associated opening in the rocker.

17. The valve according to claim 12, wherein the at least one pressing piece is fastened to the sealing element at a side of the sealing element opposite the valve seat.

18. The valve according to claim 12, wherein the actuator is arranged to engage two rocker arms, and, wherein both rocker arms are engaged by return springs.

19. The valve according to claim 12, wherein the valve is a membrane valve and a membrane is provided which extends through the cavity and delimits a fluid space from the cavity.

20. The valve according to claim 12, wherein the actuator is a magnetically driven actuator comprising a coil configured to drive the plunger.

21. A valve bank comprising several identically constructed valves and pressing pieces according to claim 12, wherein the pressing pieces have individual and in part differing positions in the actuation direction of the sealing element relative to the rocker and the valves have the same valve stroke.

22. The valve according to claim 12, wherein the pressing piece is configured to lift the sealing element off of the valve seat in response to pivoting the rocker.

* * * * *